US012162080B2

(12) United States Patent
Kamiya

(10) Patent No.: US 12,162,080 B2
(45) Date of Patent: Dec. 10, 2024

(54) ELECTRIC ROTARY TOOL

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 140 days.

(21) Appl. No.: 17/521,493

(22) Filed: Nov. 8, 2021

(65) Prior Publication Data

US 2022/0193791 A1 Jun. 23, 2022

(30) Foreign Application Priority Data

Dec. 17, 2020 (JP) ................................. 2020-209549

(51) Int. Cl.
*B23B 45/02* (2006.01)
*B23B 45/00* (2006.01)

(52) U.S. Cl.
CPC ............ *B23B 45/02* (2013.01); *B23B 45/001* (2013.01); *B23B 45/008* (2013.01)

(58) Field of Classification Search
CPC ...... B23B 45/001; B23B 45/008; B23B 45/02
USPC ........................................................ 173/217
See application file for complete search history.

(56) References Cited

U.S. PATENT DOCUMENTS

| 2013/0168121 A1* | 7/2013 | Ullrich ...................... B25F 5/02 |
| | | 173/213 |
| 2019/0061132 A1* | 2/2019 | Mori ....................... B23D 51/16 |
| 2019/0375079 A1* | 12/2019 | Kamiya ................ B23B 45/008 |
| 2020/0262036 A1 | 8/2020 | Araki et al. |

FOREIGN PATENT DOCUMENTS

| JP | 2020-75331 A | 5/2020 |
| JP | 2020-131357 A | 8/2020 |
| WO | 2021/220991 A1 | 11/2021 |

OTHER PUBLICATIONS

Apr. 16, 2024 Office Action issued in Japanese Application No. 2020-209549.

* cited by examiner

*Primary Examiner* — Robert F Long
*Assistant Examiner* — Xavier Madison
(74) *Attorney, Agent, or Firm* — Oliff PLC

(57) ABSTRACT

A housing holding a stator has increased rigidity. A vibration driver drill includes a motor including a stator and a rotor rotatable relative to the stator, a gear case in front of the motor, a gear in the gear case to receive rotation of the rotor, an output shaft protruding frontward from the gear case to receive rotation from the gear, an integral cylindrical housing accommodating the motor and including a front portion with an opening and a rear portion closed, a gear case housing connected to the front portion of the integral cylindrical housing and including a right part and a left part and holding the gear case, and a grip housing extending downward from the gear case housing.

19 Claims, 15 Drawing Sheets

ELECTRIC ROTARY TOOL

CROSS-REFERENCE TO RELATED APPLICATIONS

This application claims the benefit of priority to Japanese Patent Application No. 2020-209549, filed on Dec. 17, 2020, the entire contents of which are hereby incorporated by reference.

BACKGROUND

1. Technical Field

The present disclosure relates to an electric rotary tool such as a driver drill.

2. Description of the Background

A known electric rotary tool includes a motor in the rear of a body extending in the front-rear direction and an output unit in front of the motor. For example, an electric rotary tool described in Japanese Unexamined Patent Application Publication No. 2020-131357 includes a motor in the rear of a body extending in the front-rear direction and a gear assembly including a reducer and an output unit in front of the motor. The output unit includes a vibration assembly and a spindle protruding frontward.

A housing for the body includes a dividable housing and a rear cover. The dividable housing is joined by fastening right half and left half housings with screws. The rear cover is a cap screwed to the dividable housing from the rear.

BRIEF SUMMARY

Such a known housing includes three parts forming the body. The stator is held by the dividable housing including the right half and left half housings. The dividable housing may thus be less rigid. The stator and the rotor are held by different parts and thus may not be aligned coaxially.

One aspect of the present disclosure is directed to an electric rotary tool that increases the rigidity of a housing holding a stator.

Another aspect of the present disclosure is directed to an electric rotary tool including a stator and a rotor that are easily aligned coaxially.

A first aspect of the present disclosure provides an electric rotary tool, including:
- a motor including a stator and a rotor, the rotor being rotatable relative to the stator;
- a gear case in front of the motor;
- a gear in the gear case, the gear being configured to receive rotation of the rotor;
- an output shaft protruding frontward from the gear case, the output shaft being configured to receive rotation from the gear;
- a cylindrical housing accommodating the motor, the cylindrical housing including a front portion with an opening and a rear portion closed, the cylindrical housing being an integral cylinder;
- a gear case housing connected to the front portion of the cylindrical housing, the gear case housing including a right part and a left part and holding the gear case; and
- a grip housing extending downward from the gear case housing.

A second aspect of the present disclosure provides an electric rotary tool, including:
- a housing defining an outer wall, the housing including
  - a first integral cylindrical housing,
  - a right-left dividable housing in front of the first integral cylindrical housing, and
  - a second integral cylindrical housing in front of the right-left dividable housing;
- a motor accommodated in the first integral cylindrical housing, the motor including
  - a rotor shaft,
  - a stator having an outer circumference directly held by the first integral cylindrical housing, and
  - a rotor located circumferentially inward from the stator with a rear portion of the rotor shaft directly held by the first integral cylindrical housing with a bearing;
- a switch and a controller accommodated in the right-left dividable housing;
- a power transmitter accommodated in the second integral cylindrical housing, the power transmitter being drivable by the motor;
- a tip tool holder in front of the second integral cylindrical housing, the tip tool holder being rotatable by the power transmitter; and
- a plurality of screws extending in a front-rear direction, the plurality of screws fastening the first integral cylindrical housing, the right-left dividable housing, and the second integral cylindrical housing together.

The electric rotary tool according to the above aspects of the present disclosure increases the rigidity of the housing holding the stator. The electric rotary tool according to the above aspects of the present disclosure includes the stator and the rotor that are easily aligned coaxially.

DETAILED DESCRIPTION

Figure 1:
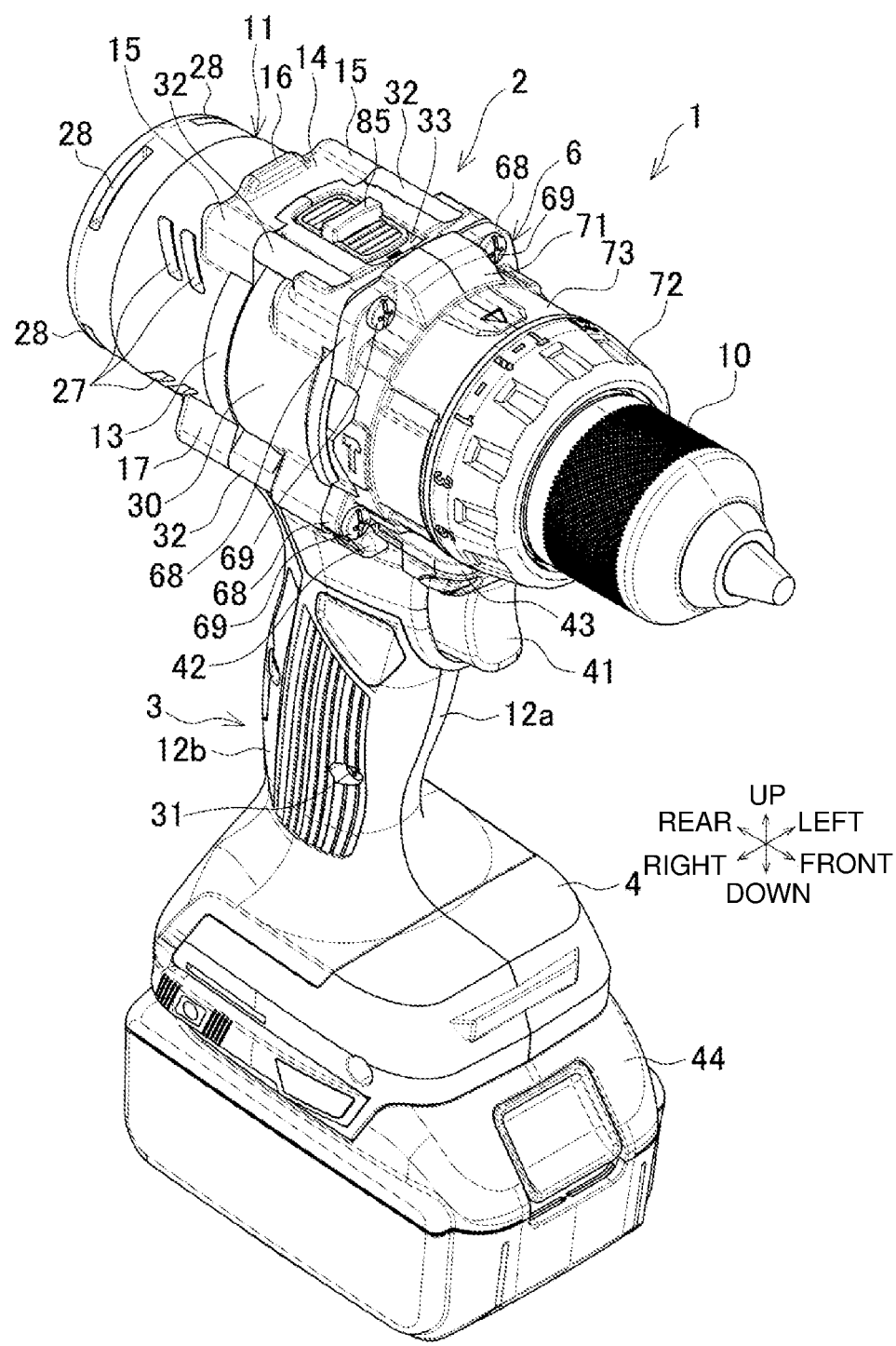
FIG. 1 is a perspective view of a vibration driver drill.
Figure 2:
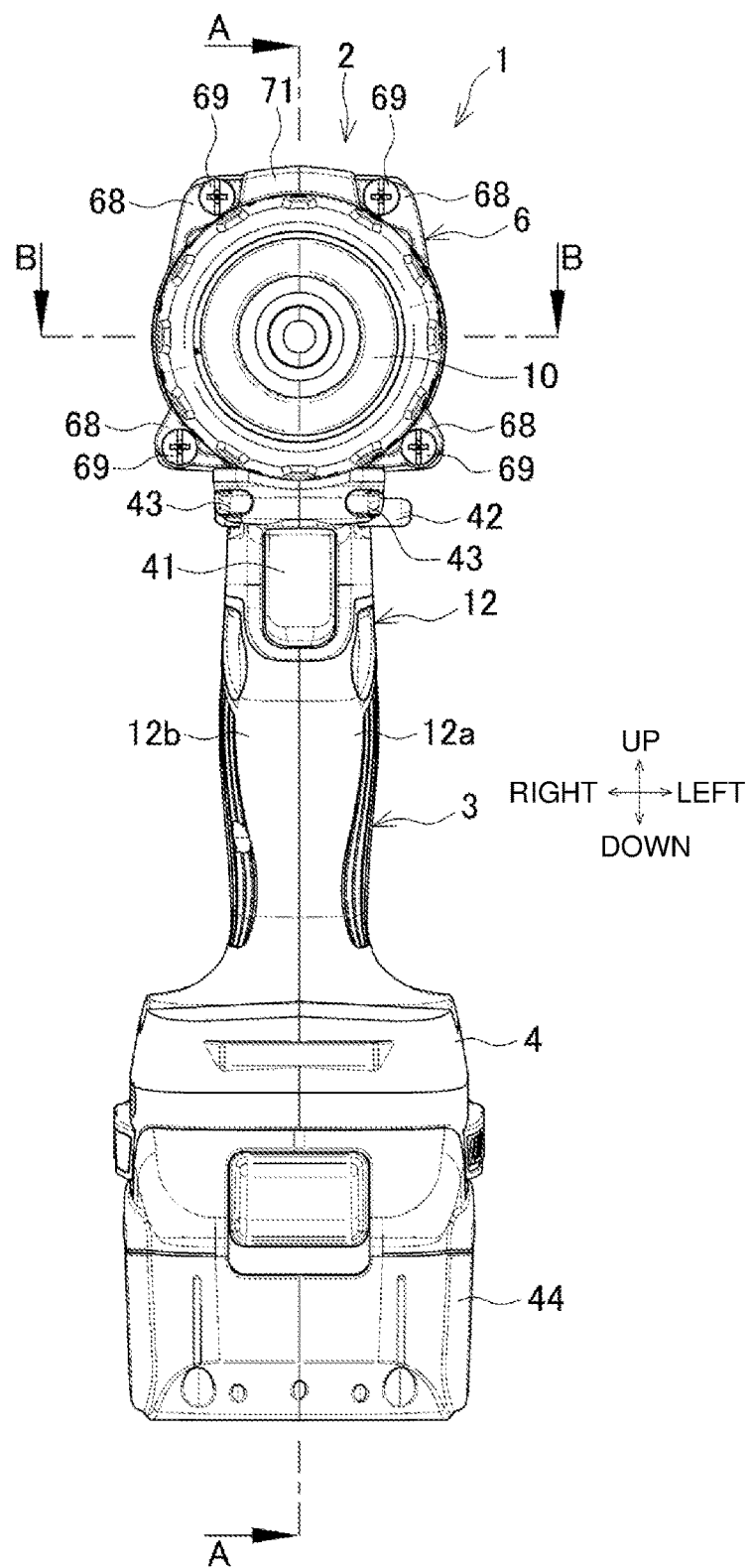
FIG. 2 is a front view of the vibration driver drill.
Figure 3:
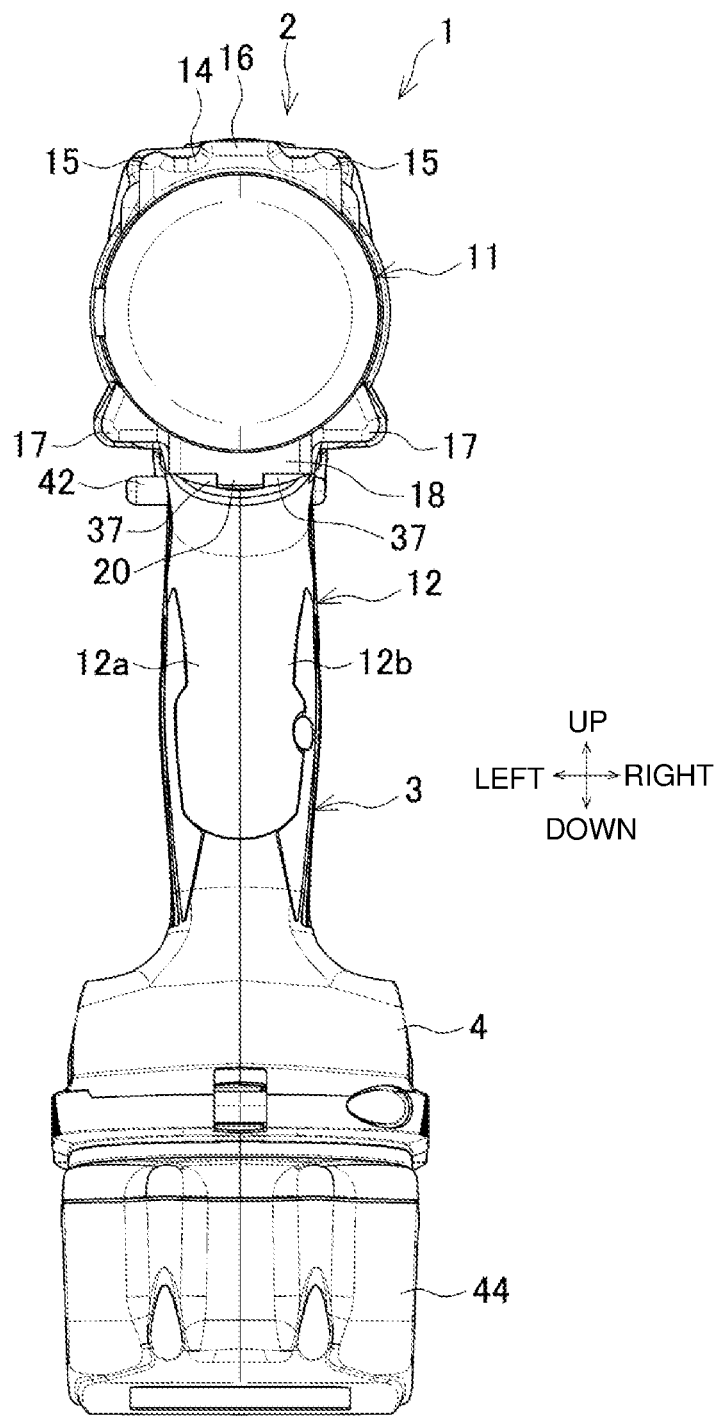
FIG. 3 is a rear view of the vibration driver drill.
Figure 4:
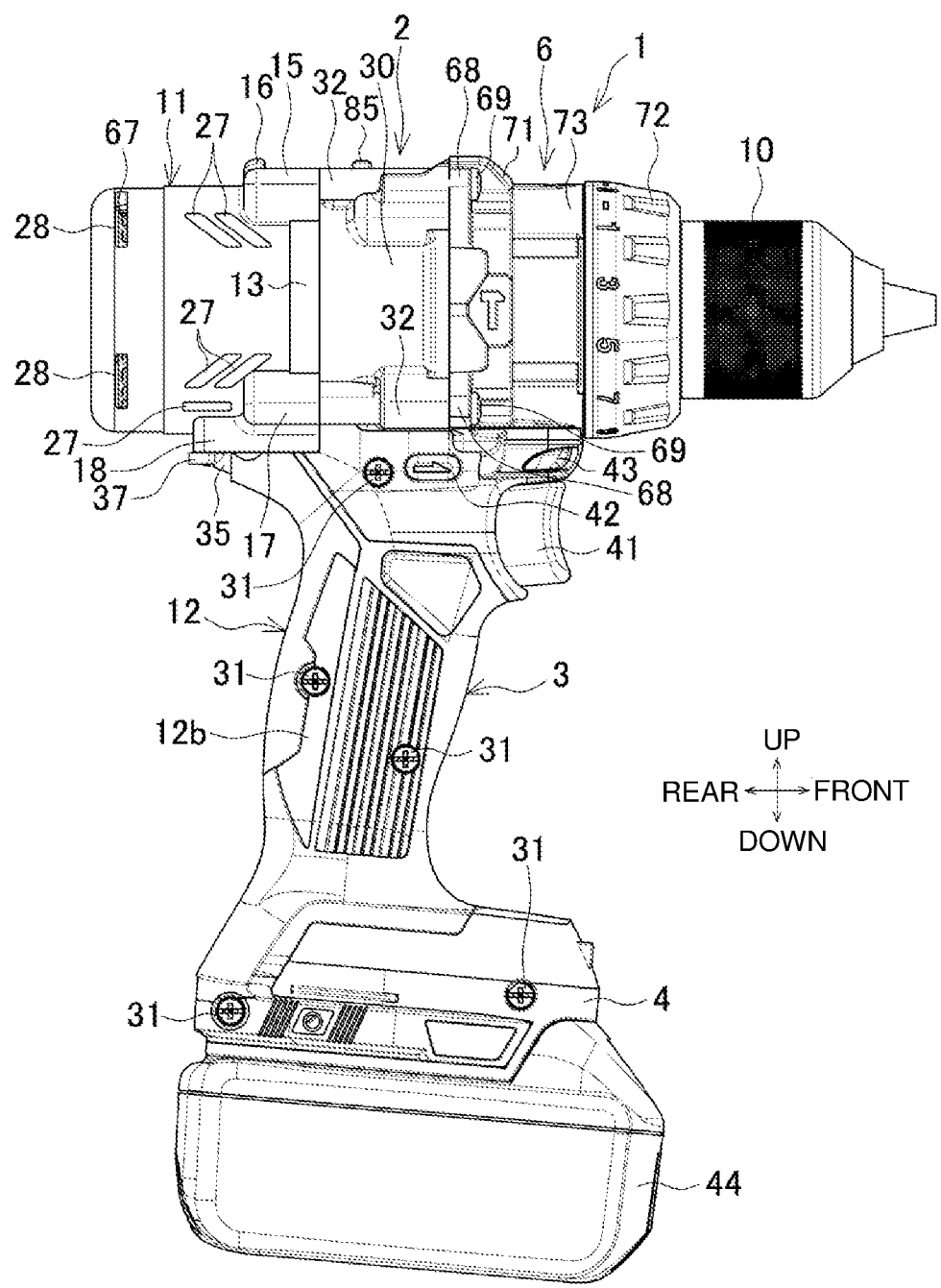
FIG. 4 is a side view of the vibration driver drill.
Figure 5:
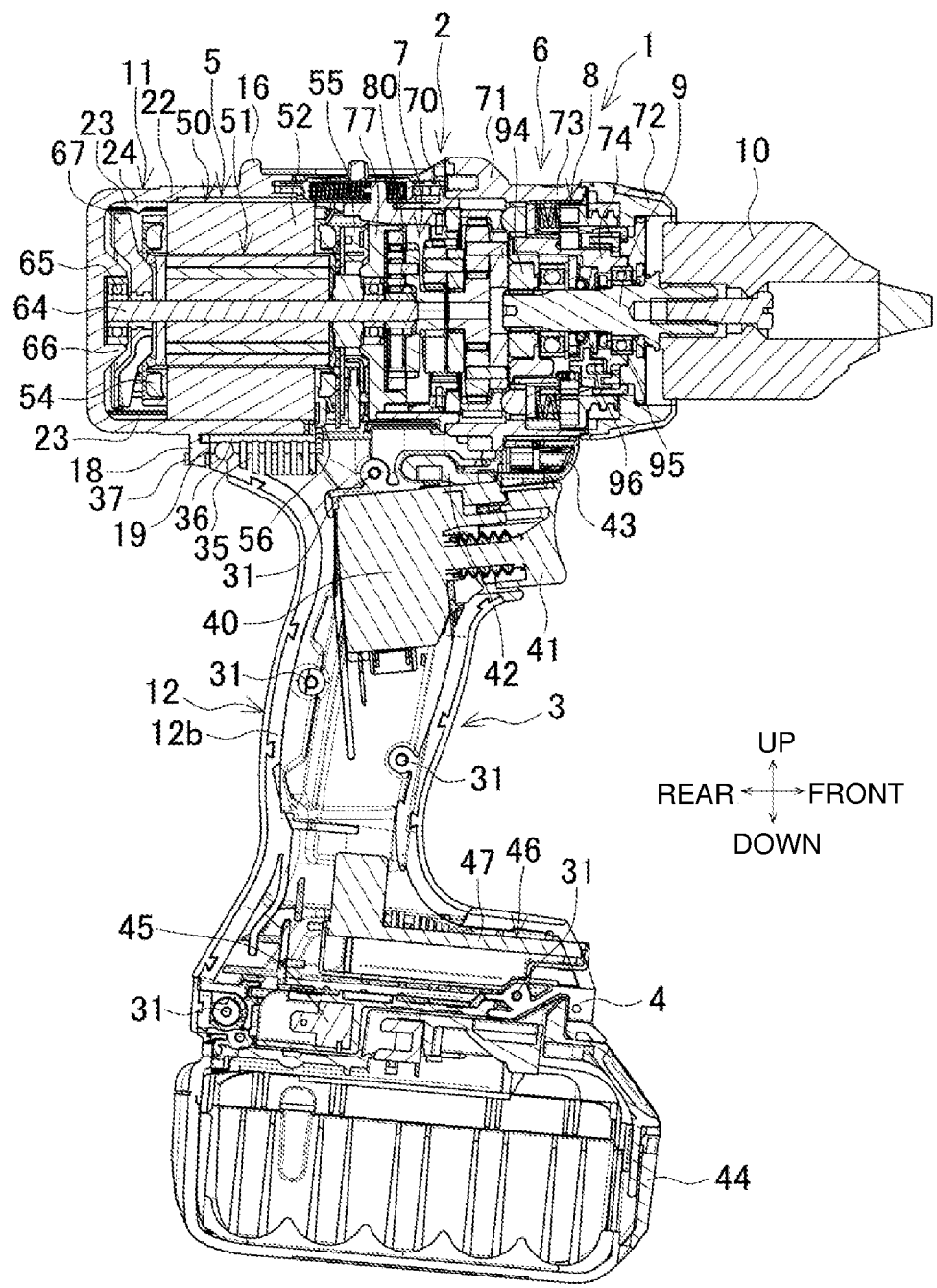
FIG. 5 is a cross-sectional view taken along line A-A in FIG. 2.

Embodiments of the present disclosure will now be described with reference to the drawings.
Vibration Driver Drill
FIG. 1 is a perspective view of a vibration driver drill as an example of an electric rotary tool. FIG. 2 is a front view the vibration driver drill. FIG. 3 is a rear view of the vibration driver drill. FIG. 4 is a side view of the vibration driver drill. FIG. 5 is a cross-sectional view taken along line A-A in FIG. 2.

A vibration driver drill 1 includes a body 2, a handle 3, and a battery mount 4. The body 2 extends in the front-rear direction. The handle 3 protrudes from a lower portion of the body 2. The body 2 and the handle 3 together form a T shape as viewed laterally. The battery mount 4 is located at the lower end of the handle 3.

The body 2 includes a brushless motor 5 and a gear assembly 6. The brushless motor 5 is located in a rear portion of the body 2. The gear assembly 6 is located in front of the brushless motor 5. The gear assembly 6 includes a reducer 7 and an output unit 8. The output unit 8 is located in front of the reducer 7. The output unit 8 includes a spindle 9 protruding frontward. A drill chuck 10 is attached to the front end of the spindle 9. The drill chuck 10 can receive a bit (not shown).

The vibration driver drill 1 includes a cylindrical housing 11 and a dividable housing 12.

The cylindrical housing 11 is located in the rear portion of the body 2. The cylindrical housing 11 accommodates the brushless motor 5. The cylindrical housing 11 includes a front portion with an opening. The cylindrical housing 11 has a rear end closed. The cylindrical housing 11 is cylindrical and has a bottom.

Figure 6:
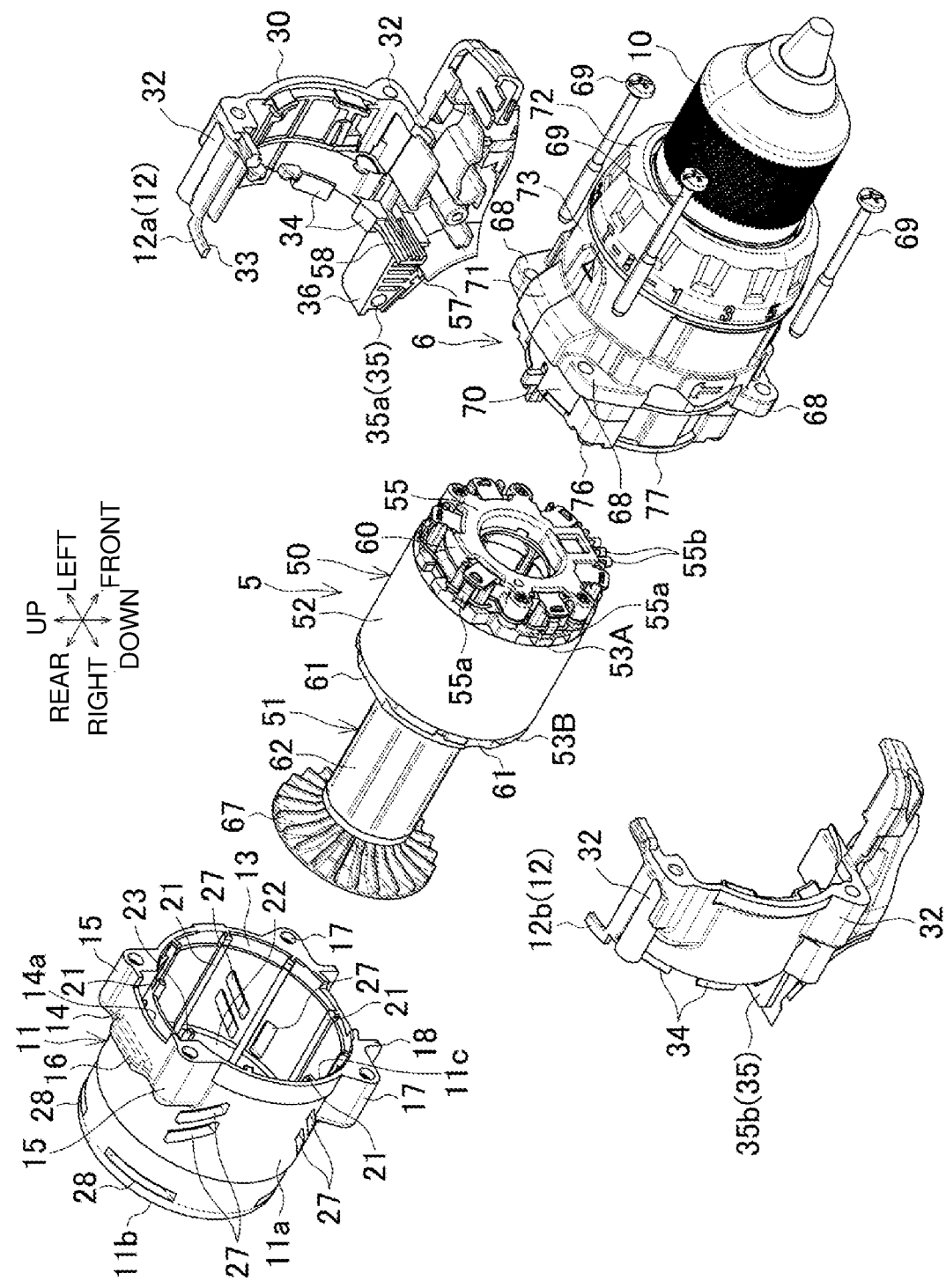
FIG. 6 is an exploded perspective view of a body as viewed from the upper front.
Figure 7:
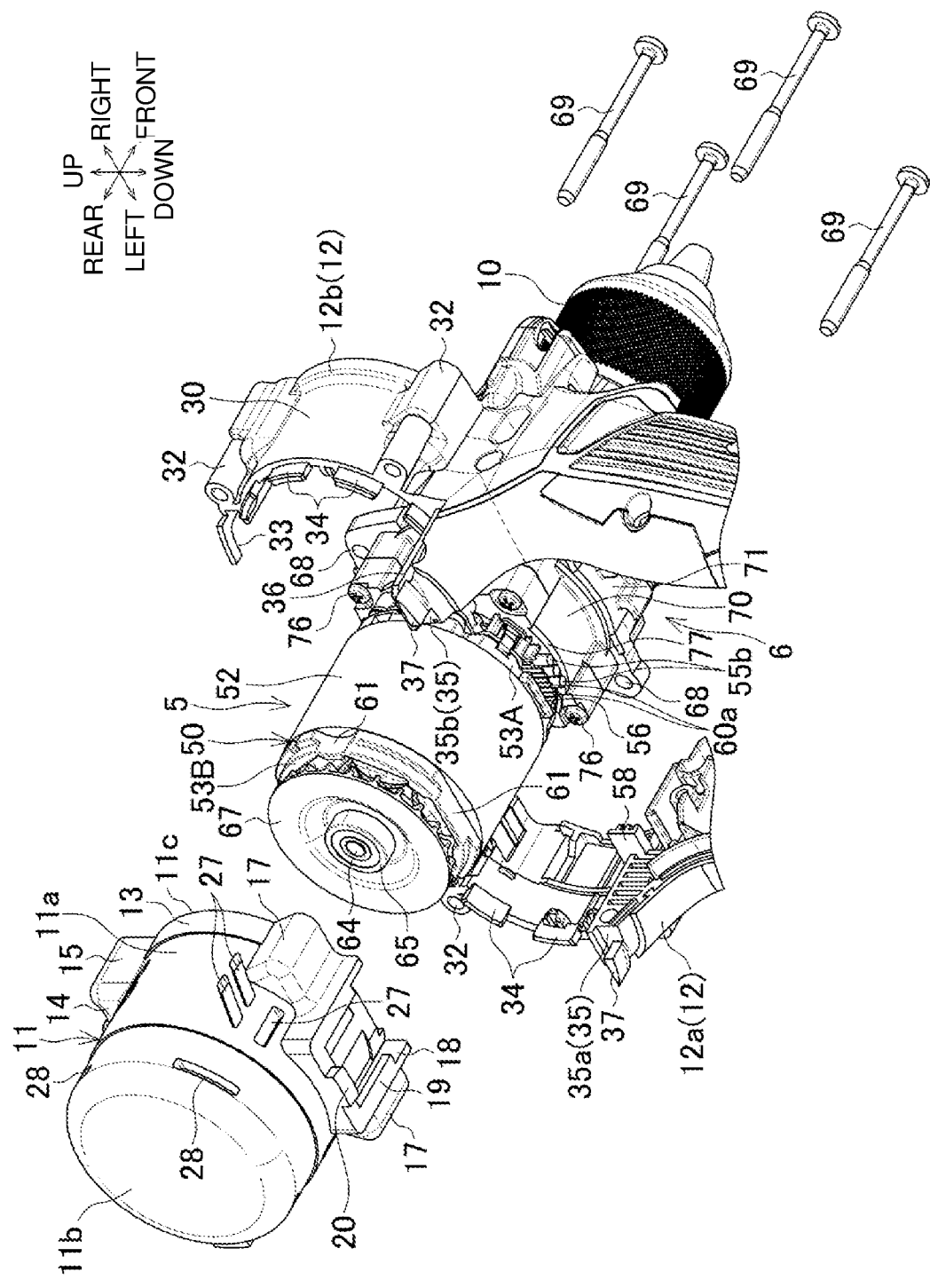
FIG. 7 is an exploded perspective view of the body as viewed from the lower rear.

As shown in FIGS. 6 and 7, the cylindrical housing 11 includes a cylindrical portion 11a, a plate 11b, and an opening 11c. The cylindrical portion 11a extends in the front-rear direction. The plate 11b is joined to the rear end of the cylindrical portion 11a and closes the cylindrical portion 11a. The opening 11c is in the front portion of the cylindrical portion 11a. The cylindrical portion 11a has a larger-diameter portion 13 on its front end. The larger-diameter portion 13 has an inner diameter greater than the diameter of a rear portion of the cylindrical portion 11a.

The cylindrical housing 11 includes a protruding portion 14 on its upper front. The protruding portion 14 protrudes upward from the outer circumferential surface of the cylindrical portion 11a and extends laterally. The protruding portion 14 has two upper screw bosses 15 on its right and left ends. The two upper screw bosses 15 face frontward. A lateral rib 16 protrudes from a rear end of the protruding portion 14 between the two upper screw bosses 15. The lateral rib 16 extends laterally. The lateral rib 16 protrudes more upward than the upper screw bosses 15.

The cylindrical housing 11 has two lower screw bosses 17 on its lower front. The two lower screw bosses 17 extend laterally. The two lower screw bosses 17 face frontward. A frame 18 is located between the two lower screw bosses 17. The frame 18 is open frontward and downward, and is U-shaped in a bottom view. An extension 19 extends continuously from the frame 18. The extension 19 extends inward from the right, left, and rear edges. The frame 18 has a protrusion 20 on its rear lower surface.

Figure 8:
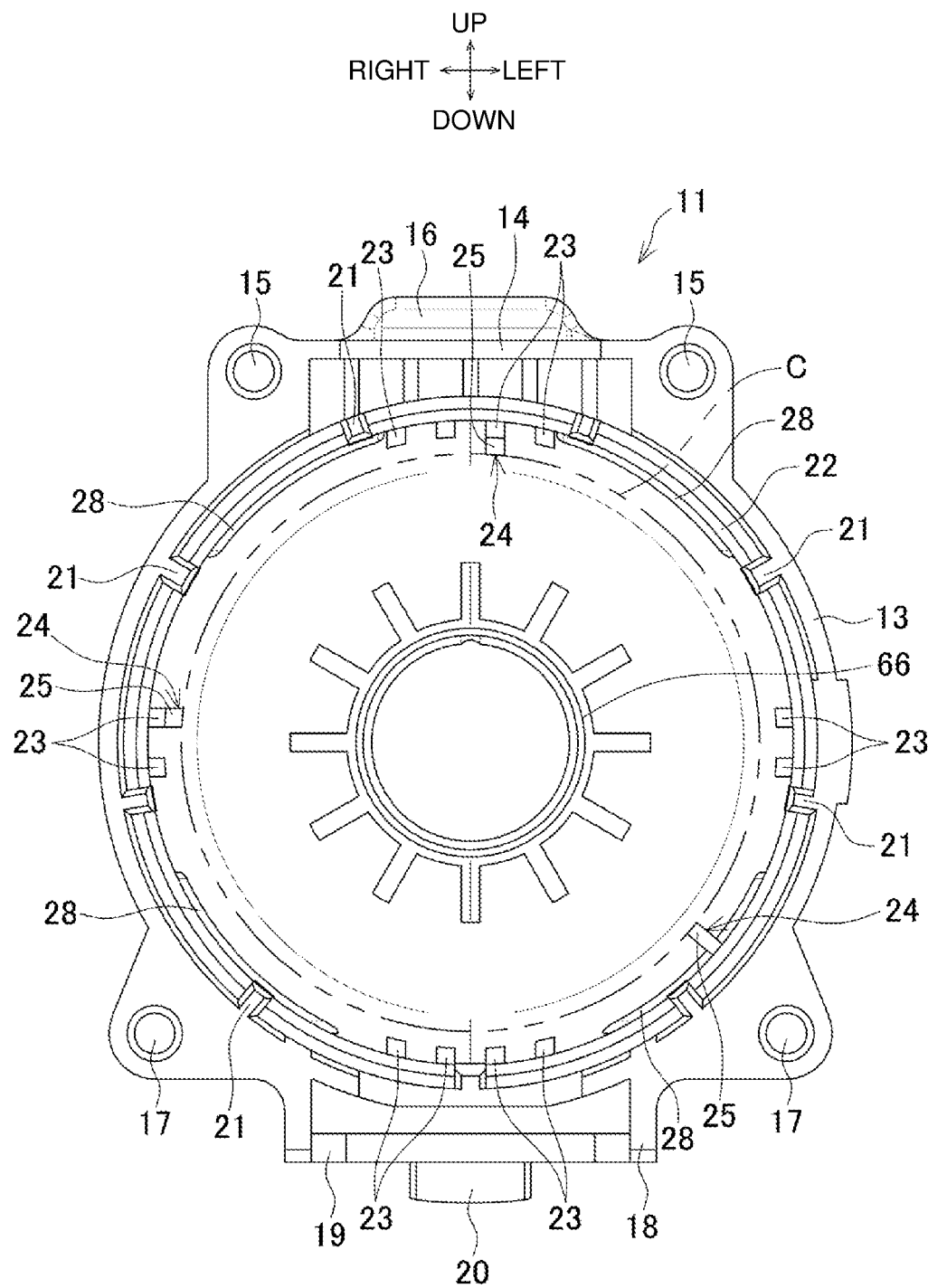
FIG. 8 is a front view of a cylindrical housing.
Figure 9:
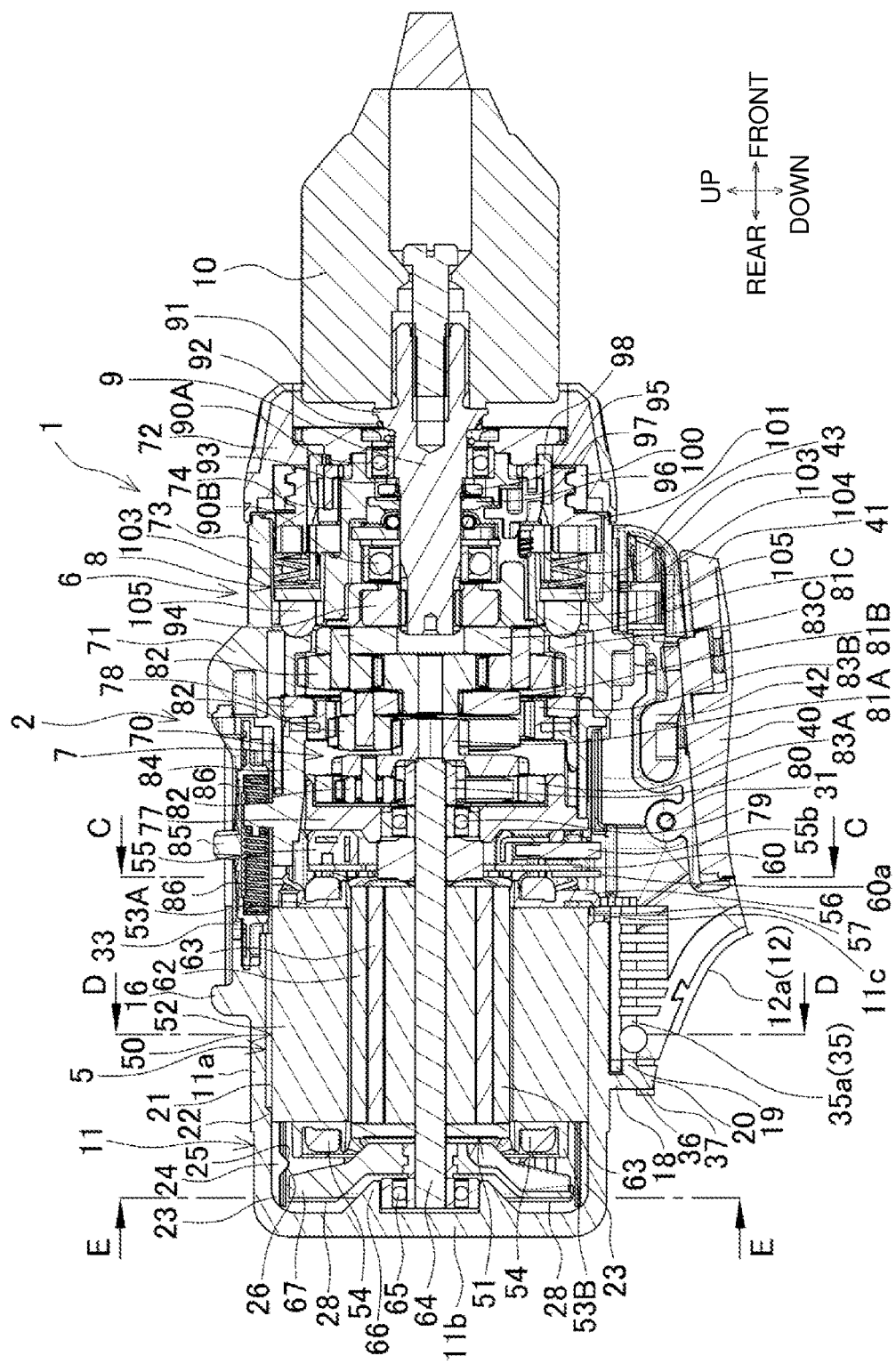
FIG. 9 is an enlarged view of the body in FIG. 5.

As shown in FIGS. 8 and 9, the cylindrical housing 11 including the larger-diameter portion 13 has multiple support ribs 21 on its inner circumferential surface. The support ribs 21 extend parallel to the axial direction of the cylindrical housing 11. The multiple support ribs 21 are arranged at circumferentially predetermined intervals.

The cylindrical housing 11 includes a smaller-diameter portion 22 along its entire inner circumferential surface at the rear. The smaller-diameter portion 22 has a smaller inner diameter than the front portion of the cylindrical housing 11. The smaller-diameter portion 22 has its inner circumferential surface radially outward from the inner surfaces of the support ribs 21 in the radial direction of the cylindrical housing 11.

The smaller-diameter portion 22 has multiple positioning ribs 23 at upper, lower, right, and left positions on the inner circumferential surface. The positioning ribs 23 extend parallel to the axial direction of the cylindrical housing 11. The positioning ribs 23 located radially inside the cylindrical housing 11 have their end faces nearer the axis of the cylindrical housing 11 than the end faces of the support ribs 21 located radially inside the cylindrical housing 11.

The smaller-diameter portion 22 has three guide protrusions 24 protruding radially inward. Each guide protrusion 24 has a front slope 25 and a rear slope 26. The front slope 25 slopes toward the axis of the cylindrical housing 11 rearward. The rear slope 26 slopes toward the axis of the cylindrical housing 11 frontward. The guide protrusions 24 are triangular as viewed laterally. Each guide protrusion 24 has the front slope 25 and the rear slope 26 that meet each other at the position nearest the axis of the cylindrical housing 11. Of the three guide protrusions 24, the upper and right guide protrusions 24 protrude from the positioning ribs 23, and the lower left guide protrusion 24 protrudes from the inner circumferential surface of the smaller-diameter portion 22. The tips of the guide protrusions 24 are on a concentric circle C (FIG. 8) having the center along the axis of the cylindrical housing 11. The concentric circle C is slightly larger than the outer diameter of a fan 67 (described later).

Figure 12:
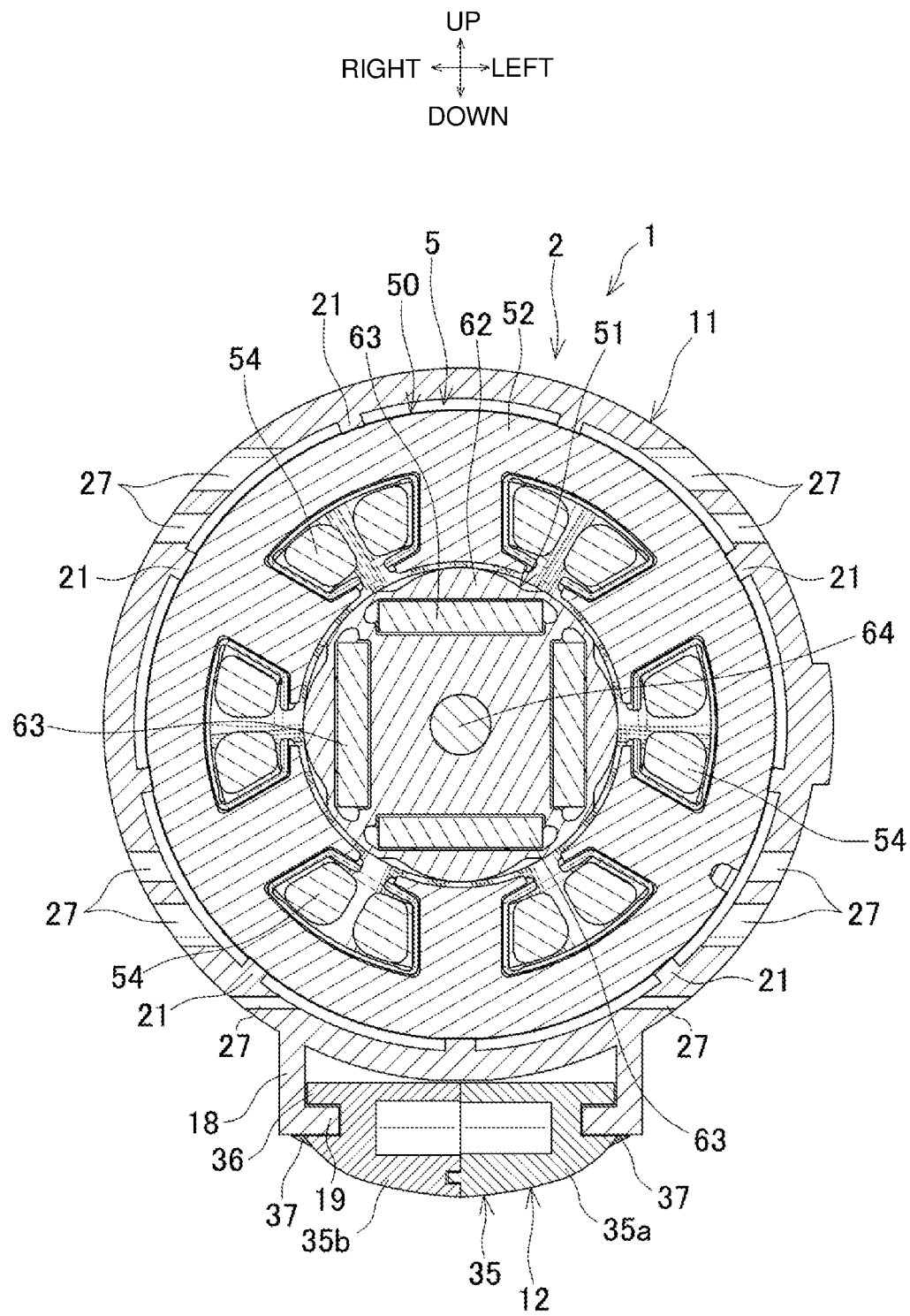
FIG. 12 is an enlarged cross-sectional view taken along line D-D in FIG. 9.

The cylindrical housing 11 has multiple inlets 27 in its front right and left portions. The inlets 27 are slits. As shown in FIG. 12, each inlet 27 is between adjacent support ribs 21.

The smaller-diameter portion 22 of the cylindrical housing 11 has multiple outlets 28. The outlets 28 are slits extending in the circumferential direction of the cylindrical housing 11.

The dividable housing 12 is connected to an intermediate cylinder 30 and the handle 3. The intermediate cylinder 30 is located in front of the cylindrical housing 11. The dividable housing 12 includes left and right half housings 12a and 12b. The half housings 12a and 12b are fastened together with multiple screws 31 placed from the right of the handle 3.

The intermediate cylinder 30 has four cylindrical parts 32 on its outer circumference. The cylindrical parts 32 are located in front of and coaxially with either the upper screw bosses 15 or the lower screw bosses 17 on the cylindrical housing 11. The cylindrical parts 32 extend in the front-rear direction. A window 33 is formed between the upper right and left cylindrical parts 32. A speed switch lever 85 (described later) is exposed through the window 33. The protruding portion 14 on the cylindrical housing 11 has a hole 14a (FIG. 6). The hole 14a receives the speed switch lever 85.

The intermediate cylinder 30 has multiple wall ribs 34 at circumferentially predetermined intervals on its rear end. The wall ribs 34 extend circumferentially. The wall ribs 34 are fitted in the larger-diameter portion 13 of the cylindrical housing 11. Each support rib 21 is located between adjacent wall ribs 34.

A fitting portion 35 is located on the upper rear end of the handle 3. The fitting portion 35 includes a half part 35a on the left half housing 12a and a half part 35b on the right half housing 12b that are joined together. The fitting portion 35 extends rearward. The fitting portion 35 is fitted in the frame 18 in the cylindrical housing 11. The fitting portion 35 has an engagement part 36 on its outer circumference. The engagement part 36 is engaged with the extension 19 from above. A pair of right and left holding protrusions 37 protrude rearward from below the fitting portion 35. The holding protrusions 37 are placed on the right and left of the protrusion 20 on the extension 19.

Figure 13:
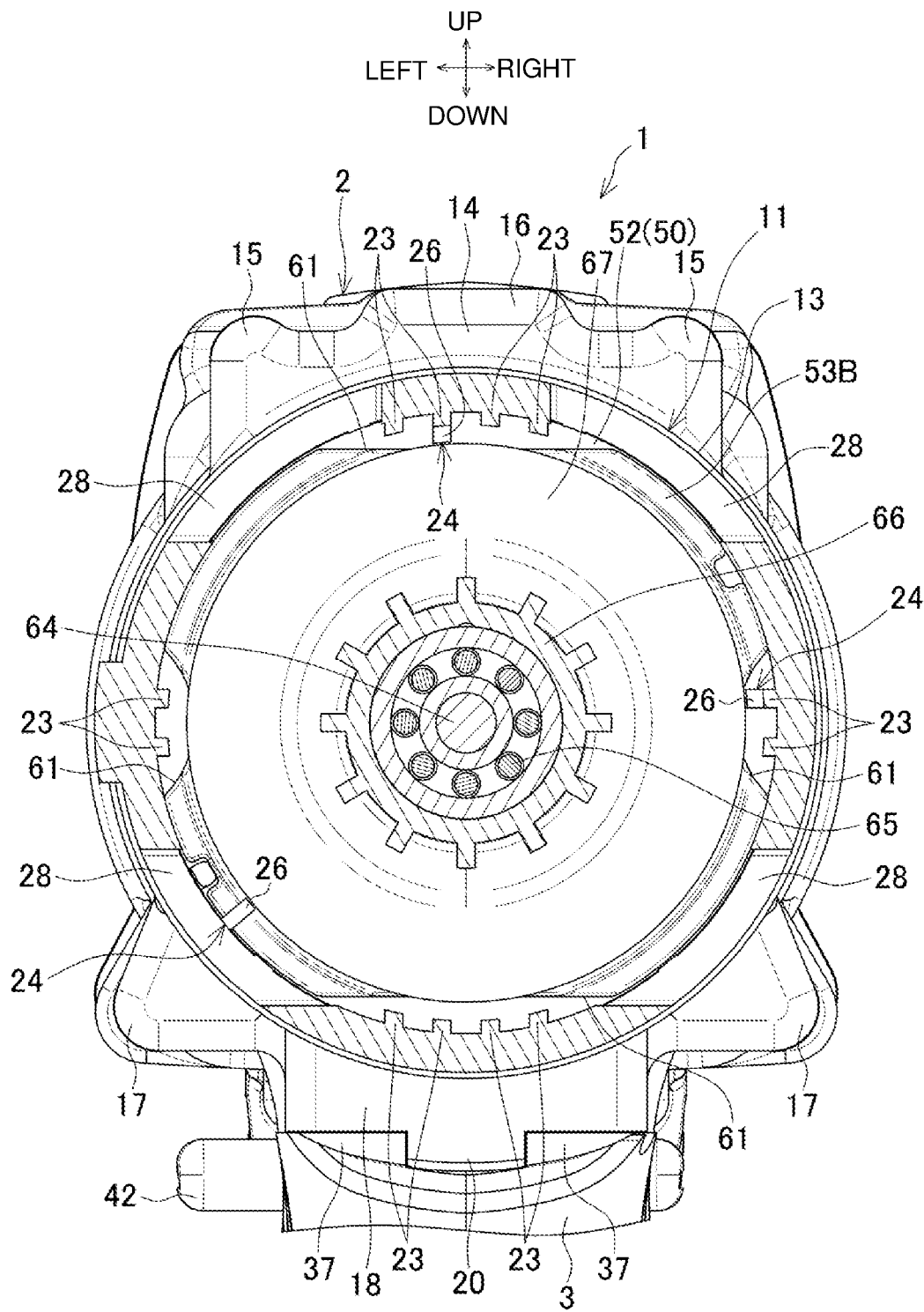
FIG. 13 is an enlarged cross-sectional view taken along line E-E in FIG. 9.

Thus, when the fitting portion 35 of the handle 3 is fitted into the frame 18 from the front, the engagement part 36 is engaged with the upper end of the extension 19 as shown in FIG. 12. At the same time, the holding protrusions 37 are placed on the right and left of the protrusion 20 (FIGS. 3 and 13). The fitting portion 35 fitted in the frame 18 positions the cylindrical housing 11 and the dividable housing 12 laterally relative to each other.

The handle 3 accommodates a switch 40 (FIG. 5) in its upper portion. The switch 40 has its front connected to a trigger 41. A forward-reverse switch button 42 is located above the switch 40. The forward-reverse switch button 42 switches the rotation of the brushless motor 5. A pair of right and left lamps 43 are located in front of the forward-reverse switch button 42. The lamps 43 illuminate ahead of the drill chuck 10.

A battery pack 44 is slid and installed on the battery mount 4 from the front. The battery mount 4 includes a terminal mount 45 in its lower portion. The terminal mount 45 is electrically connectable to the battery pack 44. The battery mount 4 accommodates a controller 46 above the terminal mounts 45. The controller 46 includes a control circuit board 47. The control circuit board 47 includes, for example, a microcomputer and switching elements for controlling the brushless motor 5.

Figure 10:
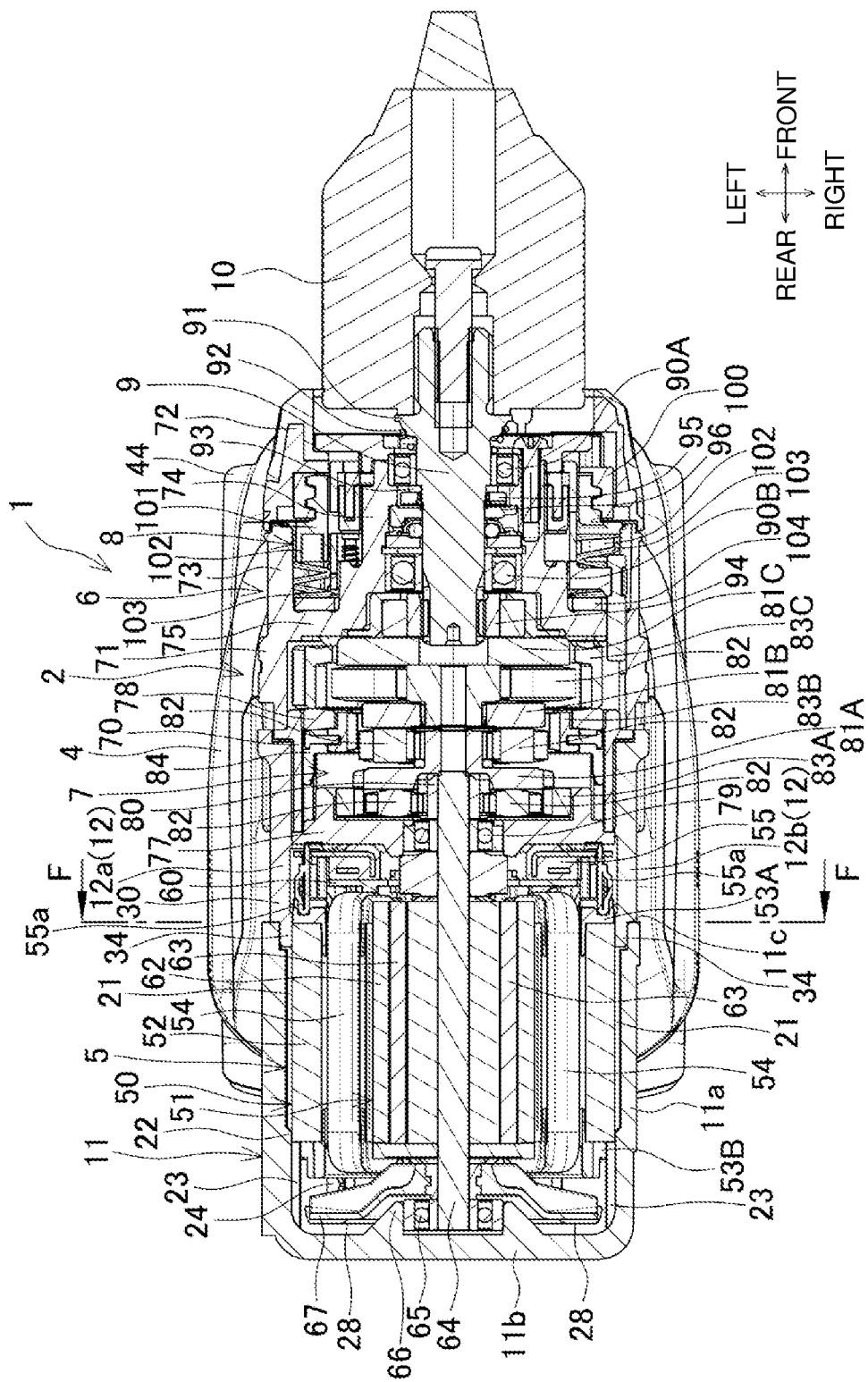
FIG. 10 is an enlarged cross-sectional view taken along line B-B in FIG. 2.

As shown in FIGS. 9 and 10, the brushless motor 5 is an inner-rotor motor. The brushless motor 5 includes a stator 50 and a rotor 51 located inside the stator 50. The stator 50 includes a stator core 52, front and rear insulators 53A and 53B, and multiple coils 54. The stator core 52 includes multiple layered steel plates stacked on one another. The insulator 53A is on the front of the stator core 52. The insulator 53B is on the rear of the stator core 52. The coils 54 are wound around the stator core 52 with the insulators 53A and 53B in between. The front insulator 53A includes multiple connector terminals 55a. The connector terminals 55a are adjacent to the opening 11c in the cylindrical housing 11 for fusing wires extending from the coils 54. The connector terminals 55a are connected to a wire connector 55. The connector terminals 55a and the wire connector 55 form a three-phase connection.

Figure 11:
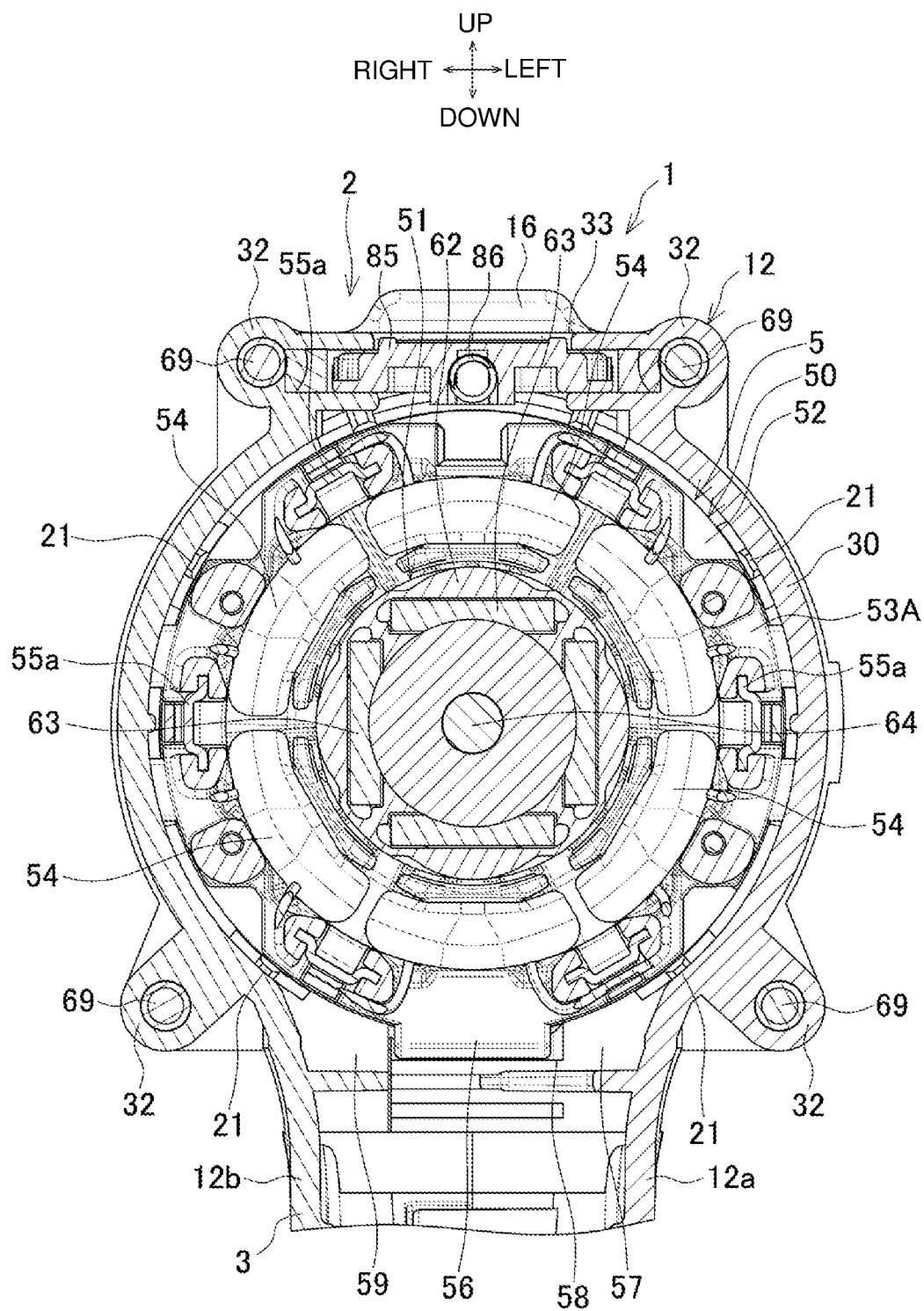
FIG. 11 is an enlarged cross-sectional view taken along line C-C in FIG. 9.

As shown in FIG. 11, a rotation locking tab 56 is located at the lateral center of a lower portion of the front insulator 53A. The rotation locking tab 56 is strip-shaped and extends laterally. The rotation locking tab 56 protrudes downward from the stator core 52.

The left half housing 12a forming the intermediate cylinder 30 has a left receiver 57 facing rightward. The left receiver 57 has an engagement recess 58 engaged with the rotation locking tab 56. The right half housing 12b forming the intermediate cylinder 30 has a right receiver 59. The right receiver 59 is in contact with the right side of the left receiver 57 to close the right side of the engagement recess 58.

A sensor circuit board 60 is placed between the front insulator 53A and the wire connector 55. The sensor circuit board 60 receives a rotation detector. The rotation detector can detect the magnetic field of multiple permanent magnets 63 (described later). The sensor circuit board 60 is adjacent to the opening 11c in the cylindrical housing 11.

The wire connector 55 and the sensor circuit board 60 are located in front of the stator 50. In the cylindrical housing 11 being an integral cylinder, three-phase power supply lines 55b connected to the wire connector 55 and signal lines 60a connected to the sensor circuit board 60 are easily routed to the controller 46 in the handle 3 through the opening 11c in the cylindrical housing 11. The power supply lines 55b and the signal lines 60a can thus be shorter.

As shown in FIGS. 6, 7, and 13, the rear insulator 53B has four cutouts 61 in its upper, lower, right, and left edges. Each cutout 61 is at a position to receive the corresponding positioning rib 23 on the cylindrical housing 11 from the rear.

The rotor 51 includes a rotor core 62 and the permanent magnets 63. A rotational shaft 64 is fixed along the axis of the rotor core 62. The permanent magnets 63 are embedded in through-holes in the rotor core 62. The rotational shaft 64 has a rear end axially supported by a bearing 65. The bearing 65 is held in a bearing holder 66 protruding from the rear inner bottom surface of the cylindrical housing 11.

A fan 67 is fixed to the rotational shaft 64 between the bearing 65 and the rotor core 62. The outlets 28 are located radially outside the fan 67. The fan 67 is recessed toward the front in the center portion of its rear surface. The bearing holder 66 protrudes toward the center portion of the rear surface of the fan 67. Thus, the bearing 65, the bearing holder 66, and the fan 67 overlap in the radial direction of the cylindrical housing 11.

The gear assembly 6 and the dividable housing 12 are joined to the brushless motor 5 in advance. The dividable housing 12 is then joined by fitting the rotation locking tab 56 on the front insulator 53A being at the bottom into the engagement recess 58 on the left receiver 57 in the intermediate cylinder 30 as in FIG. 11. This causes the stator 50 to be held by the intermediate cylinder 30 in a manner nonrotatable with the insulator 53A in between.

Figure 15:
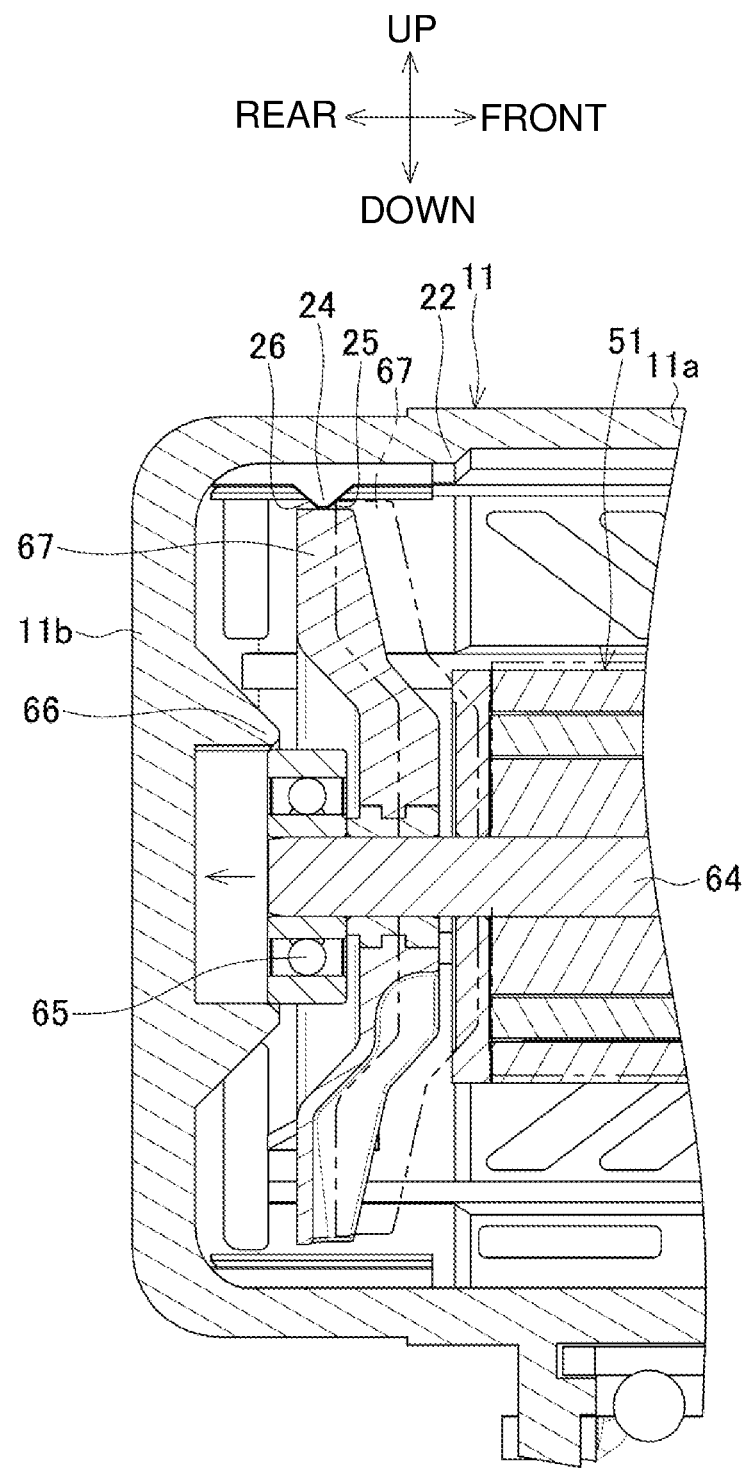
FIG. 15 is a diagram describing a brushless motor being inserted into the cylindrical housing.

The brushless motor 5 is then installed in the cylindrical housing 11. The rotor 51 is placed through the opening 11c in the cylindrical housing 11 by first inserting the bearing 65. The bearing 65 is fitted into the bearing holder 66 from the front. The fan 67 passing through the smaller-diameter portion 22 moves rearward into the cylindrical housing 11 together with the bearing 65 having its outer circumference in contact with one of the three guide protrusions 24 as indicated with the two-dot chain line in FIG. 15. The fan 67 is thus guided toward the center along the front slope 25 of the guide protrusion 24 as indicated with the solid line, without being affected by the magnetic force from the rotor 51. The fan 67 and the bearing 65 thus move rearward with their axes being aligned with the axis of the cylindrical housing 11. This axial alignment allows the bearing 65 to be fitted into the bearing holder 66 smoothly. With the bearing 65 being fitted, the fan 67 is behind the guide protrusion 24 and is adjacent to the plate 11b. The guide protrusion 24 has the rear slope 26 in its rear, thus leaving a clearance between the guide protrusion 24 and the fan 67.

The stator 50 is then placed through the opening 11c in the cylindrical housing 11. As shown in FIGS. 9, 10, and 13, the positioning ribs 23 come in contact with the respective upper, lower, right, and left portions of the rear end face of the stator core 52 exposed through the cutouts 61 in the insulator 53B. The stator 50 is thus restricted from moving rearward. The stator 50 is held by the support ribs 21 on the cylindrical housing 11 to align the stator 50 to be coaxial with the cylindrical housing 11. The support ribs 21 are received in the cutouts 61. This substantially positions the stator 50 circumferentially.

Figure 14:
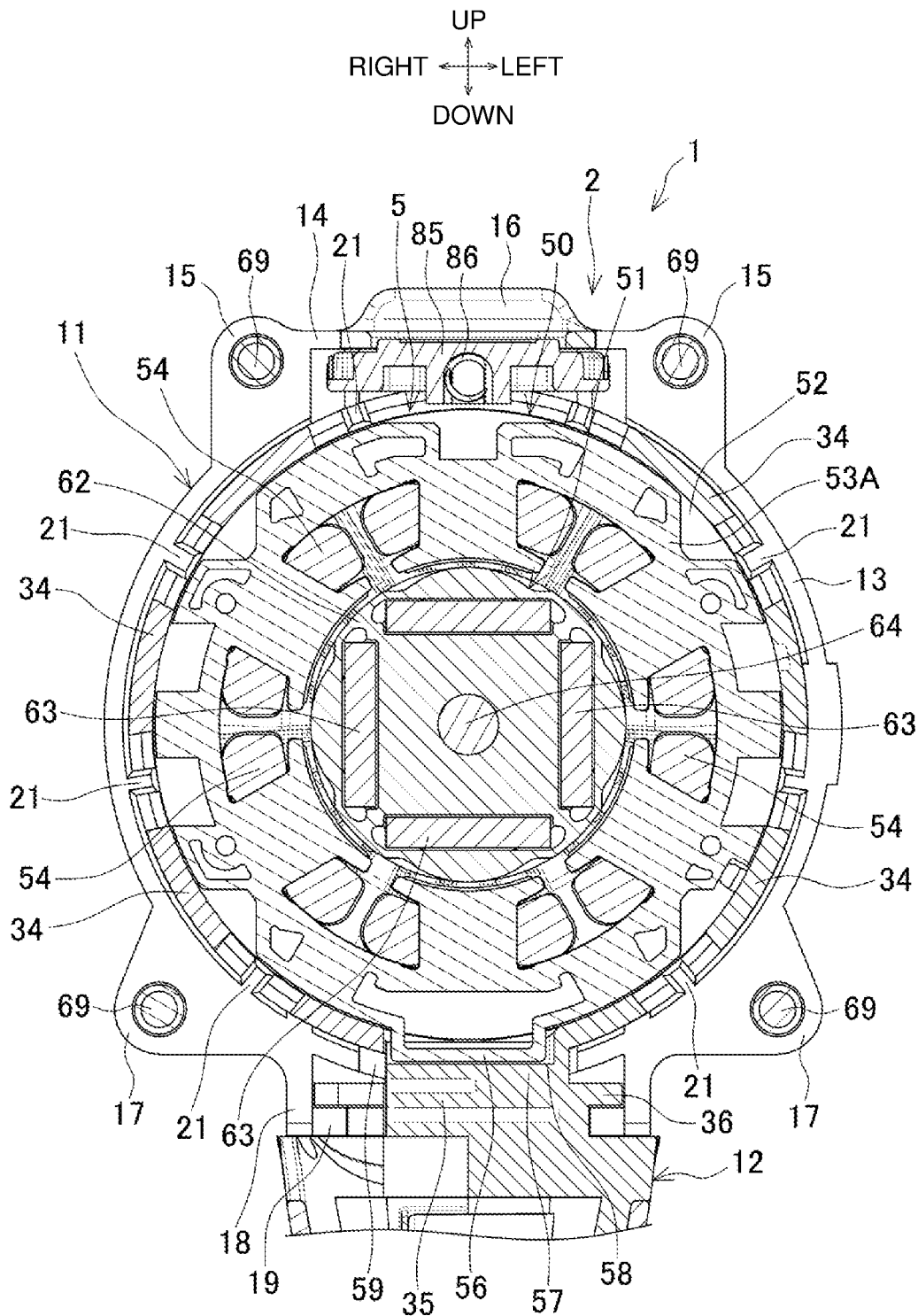
FIG. 14 is an enlarged cross-sectional view taken along line F-F in FIG. 10.

As shown in FIG. 14, the support ribs 21 on the cylindrical housing 11 are then positioned between the wall ribs 34 on the intermediate cylinder 30. This allows the wall ribs 34 on the intermediate cylinder 30 to be fitted into the larger-diameter portion 13 of the cylindrical housing 11. The fitting portion 35 is also fitted into the frame 18 at the bottom of the lower surface of the cylindrical housing 11 from the front. This allows the cylindrical housing 11 to be joined to the dividable housing 12 in a nonrotatable manner. In this state, a pinion 80 meshes with planetary gears 82.

The gear assembly 6 has four screwing portions 68 on the rear end of a large-diameter cylindrical portion 73 of a second gear case 71 (described later). The screwing portions 68 are located in front of the cylindrical parts 32 on the outer circumference of the intermediate cylinder 30.

Screws 69 placed through the respective screwing portions 68 from the front are received through the respective cylindrical parts 32 of the intermediate cylinder 30. Each screw 69 is then tightened into the corresponding upper screw boss 15 or lower screw boss 17 in the cylindrical housing 11. As shown in FIGS. 1 to 4, the cylindrical housing 11, the dividable housing 12, and the gear assembly 6 are integrally connected with the screws 69.

The gear assembly 6 includes a cylindrical first gear case 70, the cylindrical second gear case 71, and a mode switch ring 72. The second gear case 71 is joined to the front of the first gear case 70. The mode switch ring 72 is joined to the front of the second gear case 71. The mode switch ring 72 and the first gear case 70 are formed from resin. The second gear case 71 is formed from aluminum. As shown in FIGS. 9 and 10, the second gear case 71 is a double cylinder. The second gear case 71 has the large-diameter cylindrical portion 73 as an outer portion and a small-diameter cylindrical portion 74 as an inner portion that are located concentrically. The small-diameter cylindrical portion 74 extends more frontward than the large-diameter cylindrical portion 73. The large-diameter cylindrical portion 73 and the small-diameter cylindrical portion 74 are joined together at the basal end of the small-diameter cylindrical portion 74 with a joint 75.

The first gear case 70 is coupled to the large-diameter cylindrical portion 73 from behind with multiple screws 76 (FIGS. 6 and 7). The first gear case 70 has its rear end covered by a bracket plate 77 fastened together with the screws 76. A coupling gear 78 is held in the large-diameter cylindrical portion 73.

The rotational shaft 64 has its front end placed through the bracket plate 77. The bracket plate 77 holds a bearing 79. The rotational shaft 64 includes its front portion supported on the bearing 79 in a rotatable manner. The pinion 80 is fixed to the front end of the rotational shaft 64 in the first gear case 70.

The reducer 7 includes three carriers 81A to 81C that are axially aligned in three stages to support the respective three planetary gears 82. The planetary gears 82 in the respective stages can revolve inside internal gears 83A to 83C.

The internal gear 83B in the second stage is movable in the front-rear direction inside the first gear case 70. At a forward position, the internal gear 83B meshes with the coupling gear 78 and is thus nonrotatable. At a rearward position, the internal gear 83B simultaneously meshes with the carrier 81A in the first stage and the planetary gear 82 in the second stage.

A speed switch ring 84 is coupled to the internal gear 83B in an integrally movable manner in the front-rear direction. The speed switch ring 84 is coupled to the speed switch lever 85 located in the window 33 in the intermediate cylinder 30 with front and rear coil springs 86.

In response to the speed switch lever 85 being slid rearward, the speed switch ring 84 moves rearward. The internal gear 83B then meshes with the carrier 81A in the first stage, while meshing with the planetary gear 82 in the second stage. This enables a high speed mode (second speed) in which speed reduction in the second stage is cancelled.

In response to the speed switch lever 85 being slid forward, the speed switch ring 84 moves forward. The internal gear 83B then moves forward, being separated from the carrier 81A in the first stage. The internal gear 83B meshes with the coupling gear 78 while meshing with the planetary gear 82 in the second stage and is thus nonrotatable. This enables a low speed mode (first speed) in which speed reduction in the second stage is performed.

The mode switch ring 72 is attached to the small-diameter cylindrical portion 74 of the second gear case 71 in a rotatable manner. The mode switch ring 72 is rotated to select a vibration drill mode, a drill mode, or a clutch mode (driver mode) in the output unit 8. In the vibration drill mode, the spindle 9 vibrates in the axial direction while rotating. In the drill mode, the spindle 9 simply rotates. In the clutch mode (driver mode), transmission of a rotational force from the reducer 7 to the spindle 9 is disabled in response to the clutch operation torque set by the mode switch ring 72 being achieved.

The spindle 9 is axially supported by a front bearing 90A and a rear bearing 90B in the small-diameter cylindrical portion 74. The spindle 9 is movable back and forth in the axial direction. The spindle 9 includes a flange 91 in its front portion. A coil spring 92 is located between the flange 91 and the front bearing 90A. A stopper ring 93 is fixed to the spindle 9 behind the bearing 90A. The spindle 9 is urged to the forward position at which the stopper ring 93 is in contact with the bearing 90A.

The rear end of the spindle 9 is splined to a lock cam 94. The lock cam 94 is integrally engaged with the carrier 81C in the third stage in the rotation direction.

An annular first cam 95 and an annular second cam 96 are located in the small-diameter cylindrical portion 74. The first cam 95 is fixed to the spindle 9 behind the stopper ring 93. The second cam 96 is externally mounted on the spindle 9 behind the first cam 95 in a manner separately rotatable from the spindle 9 while being restricted from moving back and forth. The first cam 95 has a cam surface on its rear surface and the second cam 96 has a cam surface on its front surface. The two cam surfaces engage with each other in the rotation direction.

A vibration switch ring 97 and a cam ring 98 are located outside the small-diameter cylindrical portion 74 and inside the mode switch ring 72. In response to a rotation operation on the mode switch ring 72, the vibration switch ring 97 moves back and forth via the cam ring 98 and is disengaged from the second cam 96. The second cam 96 is restricted from rotating when the vibration switch ring 97 is at the forward position. The second cam 96 is rotatable when the vibration switch ring 97 is at the rearward position.

The mode switch ring 72 has an internal thread 100 on its inner circumference. A screw feeding ring 101 is screwed into the internal thread 100. The screw feeding ring 101 is restricted from rotating outside the small-diameter cylindrical portion 74 and is movable in the front-rear direction. Multiple pressing bosses 102 are arranged in the circumferential direction. The pressing bosses 102 protrude rearward from a rear portion of the screw feeding ring 101. The front ends of coil springs 103 are externally mounted on the pressing bosses 102. Pressing rings 104 are located behind the coil springs 103. The pressing rings 104 are movable back and forth along the outer circumference of the small-diameter cylindrical portion 74 and are restricted from rotating. Each coil spring 103 has its rear end in contact with the corresponding pressing ring 104. Multiple pressing members 105 are held by the joint 75 on the second gear case 71 in a manner movable back and forth behind the pressing rings 104. The pressing members 105 are engaged with the front surface of the internal gear 83C in the third stage. The internal gear 83C is rotatable and is restricted from rotating under the urging force applied from the coil springs 103 through the pressing members 105.

Operation of Vibration Driver Drill

For the vibration driver drill 1, an operator presses the trigger 41 to turn on the switch 40. This causes the microcomputer in the controller 46 to supply a three-phase current to the coils 54 in the stator 50, thus rotating the rotor 51. The rotation detector in the sensor circuit board 60 outputs a rotation detection signal indicating the positions of the permanent magnets 63. The microcomputer in the controller 46 controls the on-off state of each switching element in accordance with the rotation state of the rotor 51 based on the rotation detection signals. A current then flows through the coils 54 in different phases in the stator 50 sequentially. The rotor 51 thus continuously rotates to rotate the rotational shaft 64. The pinion 80 then rotates to rotate the spindle 9 via the reducer 7. With a bit attached to the drill chuck 10, the vibration driver drill 1 is usable in a selected operational mode.

The operational modes will now be described.

The mode switch ring 72 is rotated to the leftmost as viewed from the front. At this rotational position, the vibration switch ring 97 is at the forward position. The vibration switch ring 97 thus restricts rotation of the second cam 96. The screw feeding ring 101 is at a rearmost position, causing the pressing bosses 102 to be pressed against the pressing rings 104. This restricts the forward movement of the pressing members 105, thus locking the rotation of the internal gear 83C.

In this state, the operator presses the bit attached to the drill chuck 10 against a workpiece. The spindle 9 then moves rearward together with the drill chuck 10. The first cam 95 retracts together with the spindle 9 accordingly and comes in contact with the second cam 96 that is nonrotatable. With the first cam 95 and the second cam 96 engaged with each other, the spindle 9 vibrates back and forth while rotating together with the drill chuck 10 and the bit. This is the vibration drill mode.

The mode switch ring 72 is rotated counterclockwise by about 10 degrees from the position of the vibration drill mode as viewed from the front. At this rotational position, the vibration switch ring 97 retracts, thus allowing the second cam 96 to rotate. The screw feeding ring 101 moves slightly forward from the rearmost position to release the pressing rings 104 from pressure from the pressing bosses 102. The pressing rings 104 thus move slightly forward, still allowing the pressing members 105 and the internal gear 83C to remain engaged. The internal gear 83C thus remains locked not to rotate.

In this state, the operator presses the bit attached to the drill chuck 10 against a workpiece. The spindle 9 then moves rearward together with the drill chuck 10. The first cam 95 retracts together with the spindle 9 accordingly and comes in contact with the second cam 96. The second cam 96, which is rotatable, rotates together with the first cam 95. The spindle 9 thus rotates together with the drill chuck 10 and the bit without vibrating. This is the drill mode.

The mode switch ring 72 is rotated counterclockwise by about 30 degrees from the position of the drill mode as viewed from the front. At this rotational position, the vibration switch ring 97 retracts, thus allowing the second cam 96 to rotate. The screw feeding ring 101 further moves forward. The pressing members 105 can thus advance against the urging force from the coil springs 103 until they are disengaged from the internal gear 83C.

In this state, the operator presses the bit attached to the drill chuck 10 against a workpiece. The spindle 9 then moves rearward together with the drill chuck 10. The first cam 95 retracts together with the spindle 9 accordingly and comes in contact with the second cam 96. The second cam 96, which is rotatable, rotates together with the first cam 95. The spindle 9 thus rotates together with the drill chuck 10 and the bit without vibrating.

When the torque on the spindle 9 exceeds the pressing force from the coil springs 103 maintaining the engagement between the internal gear 83C and the pressing members 105, the internal gear 83C moves relatively over the pressing members 105 and rotates without engagement. In other words, transmission of the rotational force to the spindle 9 is disabled at the predetermined torque. This is the clutch mode. In response to the mode switch ring 72 being further rotated counterclockwise, the screw feeding ring 101 moves forward through screw engagement and changes the compression amount of the coil springs 103. This can adjust the torque at which transmission of the rotational force is disabled.

In this example, the cylindrical housing 11 is used, and the left and right half housings 12a and 12b of the dividable housing 12 are screwed to the cylindrical housing 11. This structure allows the cylindrical housing 11 and the dividable housing 12 to be integrated together. In this structure, the stator 50 and the rotor 51 are coaxial with high accuracy, thus increasing the rigidity of the cylindrical housing 11 holding the stator 50. This causes less flexure of the components under the magnetic force from the rotor 51, thus preventing the rotor 51 and stator 50 from contacting each other.

The fan 67 rotates as the rotational shaft 64 rotates. The outside air is then drawn into the cylindrical housing 11 through the inlets 27. The drawn air passes between the cylindrical housing 11 and the stator 50 along the support ribs 21 and flows rearward to cool the brushless motor 5. The air cooling the brushless motor 5 then flows radially outward from the fan 67 and is discharged through the outlets 28.

The vibration driver drill 1 according to the embodiment includes the brushless motor 5 (motor) including the stator 50 and the rotor 51 rotatable relative to the stator 50. The vibration driver drill 1 includes the first gear case 70 (gear case) in front of the brushless motor 5, the planetary gears 82 (gears) in the first gear case 70 to receive the rotation of the rotor 51, and the spindle 9 (output shaft) protruding frontward from the first gear case 70 to receive the rotation from the planetary gears 82. The vibration driver drill 1 includes the integral cylindrical housing 11 accommodating the brushless motor 5 and including the front portion with the opening and the rear portion closed, the dividable housing 12 connected to the front portion of the cylindrical housing 11, including a right part and a left part, and holding the first gear case 70, and the handle 3 (grip housing) extending downward from the dividable housing 12.

This structure allows the stator 50 and the rotor 51 to be coaxially aligned easily. The structure also increases the rigidity of the cylindrical housing 11 holding the stator 50. This effectively prevents the rotor 51 and the stator 50 from contacting each other.

The vibration driver drill 1 according to the embodiment includes the brushless motor 5 including the stator 50, the rotor 51 including the rotational shaft 64 and rotatable relative to the stator 50, and the fan 67 fixed to the rotational shaft 64. The vibration driver drill 1 includes the cylindrical housing 11 having an opening end, accommodating the brushless motor 5 with the fan 67 adjacent to the bottom on the other end, and being the integral cylinder, the planetary gears 82 (gears) that receive the rotation from the brushless motor 5, and the spindle 9 (output shaft) that receives the rotation from the planetary gears 82.

This structure has less unused space in the rear portion of the cylindrical housing 11. The cylindrical housing 11 is thus downsized. With no rear cover, the structure includes fewer components and eases the assembly.

The dividable housing 12 includes the intermediate cylinder 30 (cylindrical portion) that is internally fitted in the opening in the cylindrical housing 11. The dividable housing 12, which includes two parts, can be accurately connected to the cylindrical housing 11.

The cylindrical housing 11 and the dividable housing 12 are fastened together with the screws 69 extending in the front-rear direction. The cylindrical housing 11 and the dividable housing 12 can be firmly integrated together.

The cylindrical housing 11 includes, on its inner circumferential surface, the support ribs 21 (supports) that support the stator 50 to align the stator 50 to be coaxial with the cylindrical housing 11. This allows the stator 50 to be coaxially installed in the cylindrical housing 11 easily.

The supports are the support ribs 21 protruding parallel to the axis of the cylindrical housing 11 and arranged at predetermined intervals in the circumferential direction of the cylindrical housing 11. The supports can be formed easily. This also provides air channels for cooling the brushless motor 5 between the support ribs 21.

The cylindrical housing 11 includes, on its rear inner circumferential surface, the positioning ribs 23 (positioners) that are in contact with the stator 50 to position the stator 50 in the rearward direction. The stator 50 can be easily positioned in the rearward direction.

The positioners are the positioning ribs 23 extending parallel to the axis of the cylindrical housing 11 and arranged at predetermined intervals in the circumferential direction of the cylindrical housing 11. The positioners can be formed easily.

The stator 50 is held by the dividable housing 12 in a nonrotatable manner. The dividable housing 12 can thus be used to lock rotation of the stator 50.

The stator 50 includes the insulator 53A held by the dividable housing 12. The insulator 53A can thus be used to lock rotation of the stator 50.

The rotor 51 includes the rotational shaft 64 extending in the front-rear direction. The fan 67 is fixed to a rear portion of the rotational shaft 64. The cylindrical housing 11 includes the inlets 27 and the outlets 28. The air channels can easily be formed for cooling the brushless motor 5 in the cylindrical housing 11.

The rotational shaft 64 receives the bearing 65 on its rear end behind the fan 67. The bearing 65 is held in the bearing holder 66 on the inner bottom surface of the cylindrical housing 11. The rotational shaft 64 is thus easily held coaxially with the cylindrical housing 11.

The bearing 65 and the bearing holder 66 overlap the fan 67 in the radial direction of the cylindrical housing 11. This structure has no unused space behind the fan 67. The cylindrical housing 11 can thus be downsized in the axial direction.

The cylindrical housing 11 includes, on its inner circumferential surface, the guide protrusions 24 (guides). The guide protrusions 24 come in contact with the outer circumference of the fan 67 when the bearing 65 is placed in the bearing holder 66 to guide the fan 67 to the position at which the fan 67 is coaxial with the cylindrical housing 11.

Thus, when the bearing 65 is received in the bearing holder 66, the fan 67 has its axis aligned by the guide protrusions 24. This allows the rotor 51 to be installed without the fan 67 being affected by the magnetic force from the rotor 51.

The guides are the multiple guide protrusions 24 arranged at predetermined intervals in the circumferential direction of the cylindrical housing 11. Each guide protrusion 24 includes the front slope 25 (slope) sloping toward the axis of the cylindrical housing 11 from the front to the rear and causing the tip of each guide protrusion 24 to be on the concentric circle C slightly larger than the outer circumference of the fan 67. The fan 67 thus has its axis aligned smoothly by the front slopes 25.

Each guide protrusion 24 includes the rear slope 26 (slope) sloping more outward in the radial direction of the cylindrical housing 11 from the tip toward the rear. When the bearing 65 is held in the bearing holder 66, the fan 67 separates from the guide protrusion 24, leaving a clearance between the fan 67 and the guide protrusion 24.

The cylindrical housing 11 includes, on its outer circumferential surface, the frame 18 (receiving portion) that receives the fitting portion 35 of the dividable housing 12 from the front. This structure allows the cylindrical housing 11 and the dividable housing 12 to be integrated together.

The fitting portion 35 includes the right part included in the right half housing 12b of the dividable housing 12 and the left part included in the left half housing 12a of the dividable housing 12. This structure allows the half housings 12a and 12b to be integrated together with the frame 18.

The vibration driver drill 1 according to the embodiment includes a housing defining an outer wall and including the cylindrical housing 11 (first integral cylindrical housing), the dividable housing 12 (right-left dividable housing) in front of the cylindrical housing 11, and the second gear case 71 (second integral cylindrical housing) in front of the dividable housing 12. The vibration driver drill 1 further includes the brushless motor 5 accommodated in the cylindrical housing 11, the switch 40 and the controller 46 accommodated in the dividable housing 12, the output unit 8 (power transmitter) accommodated in the second gear case 71 and drivable by the brushless motor 5, and the drill chuck 10 (tip tool holder) in front of the second gear case 71 and rotatable by the output unit 8. The brushless motor 5 includes the rotational shaft 64 (rotor shaft), the stator 50 having its outer circumference directly held by the cylindrical housing 11, and the rotor 51 located circumferentially inward from the stator 50 with the rear portion of the rotational shaft 64 (rotor shaft) directly held by the cylindrical housing 11 with the bearing 65. The vibration driver drill 1 includes the multiple screws 69 extending in the front-rear direction to fasten the cylindrical housing 11, the dividable housing 12, and the second gear case 71 together.

In this structure, the cylindrical housing 11, the dividable housing 12, and the second gear case 71 are fastened together with screws with the dividable housing 12 held between the cylindrical housing 11 at the front and the second gear case 71 at the rear, thus increasing the rigidity of the housing.

The fan 67 is fixed to the rotor 51. The cylindrical housing 11 includes, on its right and left sides, the inlets 27 to cause air from the fan 67 to flow into the cylindrical housing 11, and the outlets 28 to cause air from the fan 67 to flow out of the cylindrical housing 11. Thus, the air channels for cooling the brushless motor 5 can be formed in the cylindrical housing 11 alone.

The front portion of the cylindrical housing 11 and the rear portion of the dividable housing 12 are fitted with each other. This structure allows the housings to be integrated together.

The vibration driver drill 1 according to the embodiment includes the integral cylindrical housing 11 (motor housing) including the cylindrical portion 11a, the plate 11b joined to one end of the cylindrical portion 11a, and the opening 11c in the other end of the cylindrical portion 11a. The vibration driver drill 1 further includes the first and second gear cases 70 and 71 (gear housings) connected to the cylindrical housing 11, the output unit 8 held by the first and second gear cases 70 and 71, the brushless motor 5 accommodated in the cylindrical housing 11, the handle 3 connected to the cylindrical housing 11 and accommodating the switch 40, and the battery mount 4 (battery holder housing) connected to the handle 3 and holdable the battery pack 44. The brushless motor 5 includes the stator 50 having its outer circumference facing the cylindrical portion 11a, the rotor 51 located inward from the stator 50, the fan 67 adjacent to the plate 11b and rotatable together with the rotor 51, and the sensor circuit board 60 adjacent to the opening 11c to detect rotation of the rotor 51.

The signal lines 60a are thus efficiently routed to the brushless motor 5.

The controller 46 controls rotation of the brushless motor 5. The sensor circuit board 60 and the controller 46 are connected with the signal lines 60a (lead wires). The signal lines 60a do not pass through the cylindrical portion 11a and the plate 11b. The signal lines 60a are thus easily routed through the opening 11c.

The vibration driver drill 1 according to the embodiment includes the integral cylindrical housing 11 (motor housing) including the cylindrical portion 11a, the plate 11b joined to one end of the cylindrical portion 11a, and the opening 11c in the other end of the cylindrical portion 11a. The vibration driver drill 1 further includes the first and second gear cases 70 and 71 (gear housings) connected to the cylindrical housing 11, the output unit 8 held by the first and second gear cases 70 and 71, the brushless motor 5 accommodated in the cylindrical housing 11, the handle 3 connected to the cylindrical housing 11 and accommodating the switch 40, and the battery mount 4 (battery holder housing) connected to the handle 3 and holdable the battery pack 44. The brushless motor 5 includes the stator 50 having its outer circumference facing the cylindrical portion 11a and including the coils 54, the rotor 51 located inward from the stator 50, the fan 67 adjacent to the plate 11b and rotatable together with the rotor 51, and the connector terminals 55a adjacent to the opening 11c and connected to the coils 54.

The power supply lines 55b are thus efficiently routed to the brushless motor 5.

The vibration driver drill 1 includes the control circuit board 47 (switching element board) that energizes the brushless motor 5. The connector terminals 55a and the control circuit board 47 are connected with the power supply lines 55b (lead wires). The power supply lines 55b do not pass through the cylindrical portion 11a and the plate 11b. The power supply lines 55b are thus easily routed through the opening 11c.

Modifications

In the embodiment, the numbers of support ribs and positioning ribs located on the inner circumferential surface of the cylindrical housing and their positions may be changed as appropriate. The supports may be protrusions with any shape other than ribs. Similarly, the positioners may have any shape other than ribs. The cylindrical housing and the dividable housing may be fitted by fitting the front end of the cylindrical housing into the rear end of the dividable housing, oppositely from the embodiment.

The rotation of the stator may be locked with a structure other than the structure including the rotation locking tab on the insulator held by the dividable housing. The rotation of the stator may be locked by engaging the stator with, for example, a protrusion on the inner circumferential surface of the cylindrical housing.

The guide protrusions to guide the fan may have the front slope alone without having the rear slope. The number of guide protrusions and their positions may be changed as appropriate. The guides may have any shape other than protrusions.

The cylindrical housing may include the outlets alone. The dividable housing may include the inlets.

The cylindrical housing may include two or more layers of material.

The electric rotary tool may operate on alternating current (AC) without including a battery pack as a power supply.

In the structure according to the embodiment including the integral cylindrical housing and the right-left dividable housing, and in the structure according to the embodiment including the two integral cylindrical housings and the right-left dividable housing screwed together, the motor is not limited to a brushless motor. The number of screws to fasten the housings in the front-rear direction and their positions may be changed.

The integral cylindrical motor housing may not hold the rear portion of the rotor shaft. The structure improves the known structure failing to securely hold the stator in the right-left dividable housing.

Either the right half housing or the left half housing may hold the rear portion of the rotor shaft. In this case, the stator held by either the right half housing or the left half housing and the rotor shaft are easily aligned coaxially. The structure improves the known structure including the stator and the rotor shaft that fail to be coaxially aligned easily due to the rotor shaft held by a rear cover separately from the right-left dividable housing.

The electric rotary tool may be a driver drill without a vibration assembly. The electric rotary tool may include an electronic clutch instead of a mechanical clutch. The electric rotary tool may be an electric screwdriver or an electric drill.

In the structure according to the embodiment including the integral cylindrical housing including a fan adjacent to its bottom, the electric rotary tool may be a driver drill without a vibration assembly. The electric rotary tool may include an electronic clutch instead of a mechanical clutch. The electric rotary tool may be an electric drill or an electric screwdriver.

The electric rotary tool may have a shape other than a T shape including the body in the front-rear direction and the handle in the vertical direction. The present embodiment is also applicable to other electric rotary tools such as reciprocating saws and circular saws. Thus, the dividable housing may not include two parts.

In the embodiment in which the sensor circuit board or the connector terminals are adjacent to the opening in the motor housing, the sensor circuit board may be eliminated. In this case as well, the lead wire is easily routed from the connector terminals.

The switching elements may be mounted on the sensor circuit board, instead of the control circuit board. In this case, three power supply lines extend from the sensor circuit board.

In the embodiment, the sensor circuit board and the connector terminals protrude (forward) from the opening. In some embodiments, the sensor circuit board and the connector terminals may be located in the motor housing (rearward from the opening). In this case as well, wires are easily routed.

REFERENCE SIGNS LIST 1 vibration driver drill
2 body
3 handle
5 brushless motor
6 gear assembly
7 reducer
8 output unit
9 spindle
10 drill chuck
11 cylindrical housing
12 dividable housing
15 upper screw boss
17 lower screw boss
18 frame
21 support rib
23 positioning rib
24 guide protrusion
25 front slope
26 rear slope
27 inlet
28 outlet
30 intermediate cylinder
35 fitting portion
50 stator
51 rotor
56 rotation locking tab
57 left receiver
58 engagement recess
59 right receiver
64 rotational shaft
65 bearing
66 bearing holder
67 fan
68 screwing portion
69 screw
70 first gear case
71 second gear case
72 mode switch ring

What is claimed is:

1. An electric rotary tool, comprising:
a motor including a stator and a rotor, the rotor being rotatable relative to the stator;
a gear case in front of the motor;
a gear in the gear case, the gear being configured to receive rotation of the rotor;
an output shaft protruding frontward from the gear case, the output shaft being configured to receive rotation from the gear;
a motor housing that is cylindrical and accommodates the motor, the motor housing including a front portion with an opening and a rear portion that is closed and integral with a remainder of the motor housing;
a dividable housing connected to the front portion of the motor housing, the dividable housing including a right half housing and a left half housing and holding the gear case; and
a grip housing extending downward from the dividable housing, wherein
the motor housing includes a support on an inner circumferential surface of the motor housing, and the support supports the stator to align the stator to be coaxial with the motor housing.

2. The electric rotary tool according to claim 1, wherein the dividable housing includes a cylindrical portion internally fitted in the opening in the motor housing.

3. The electric rotary tool according to claim 1, wherein the motor housing and the dividable housing are fastened together with a screw extending in a front-rear direction.

4. The electric rotary tool according to claim 1, wherein the support includes one or more support ribs protruding parallel to an axis of the motor housing and arranged at predetermined intervals in a circumferential direction of the motor housing.

5. The electric rotary tool according to claim 1, wherein the motor housing includes a positioner on a rear inner circumferential surface of the motor housing, and the positioner is in contact with the stator to position the stator in a rearward direction.

6. The electric rotary tool according to claim 5, wherein the positioner includes one or more positioning ribs extending parallel to an axis of the motor housing and arranged at predetermined intervals in a circumferential direction of the motor housing.

7. The electric rotary tool according to claim 1, wherein the stator is held by the dividable housing in a nonrotatable manner.

8. The electric rotary tool according to claim 7, wherein the stator includes an insulator held by the dividable housing.

9. The electric rotary tool according to claim 1, wherein the rotor includes a rotational shaft extending in a front-rear direction,
the electric rotary tool further comprises a fan fixed to a rear portion of the rotational shaft, and
the motor housing includes an inlet and an outlet.

10. The electric rotary tool according to claim 9, further comprising:
a bearing attached to a rear end of the rotational shaft behind the fan; and
a bearing holder on an inner bottom surface of the motor housing, the bearing holder holding the bearing.

11. The electric rotary tool according to claim 10, wherein the bearing and the bearing holder overlap the fan in a radial direction of the motor housing.

12. The electric rotary tool according to claim 10, wherein the motor housing includes a guide on an inner circumferential surface of the motor housing, and
the guide comes in contact with an outer circumference of the fan when the bearing is placed in the bearing holder to guide the fan to a position at which the fan is coaxial with the motor housing.

13. The electric rotary tool according to claim 12, wherein the guide includes a plurality of guide protrusions arranged at predetermined intervals in a circumferential direction of the motor housing, each of the plurality of guide protrusions includes a front slope sloping toward an axis of the motor housing from a front to a rear and causing a tip of each of the plurality of guide protrusions to be on a concentric circle slightly larger than the outer circumference of the fan.

14. The electric rotary tool according to claim 13, wherein each of the plurality of guide protrusions includes a rear slope sloping more outward in a radial direction of the motor housing from the tip toward the rear.

15. An electric rotary tool, comprising:
a motor including a stator and a rotor, the rotor being rotatable relative to the stator;
a gear case in front of the motor;
a gear in the gear case, the gear being configured to receive rotation of the rotor;
an output shaft protruding frontward from the gear case, the output shaft being configured to receive rotation from the gear;
a motor housing that is cylindrical and accommodates the motor, the motor housing including a front portion with an opening and a rear portion that is closed and integral with a remainder of the motor housing;
a dividable housing connected to the front portion of the motor housing, the dividable housing including a right half housing and a left half housing and holding the gear case; and
a grip housing extending downward from the dividable housing, wherein
the dividable housing includes a fitting portion,
the motor housing includes a receiving portion on an outer circumferential surface, and
the receiving portion receives the fitting portion from a front.

16. The electric rotary tool according to claim 15, wherein the fitting portion includes a right part included in the right half housing of the dividable housing and a left part included in the left half housing of the dividable housing.

17. An electric rotary tool, comprising:
a housing defining an outer wall, the housing including
a first integral cylindrical housing,
a right-left dividable housing in front of the first integral cylindrical housing, and
a second integral cylindrical housing in front of the right-left dividable housing;
a motor accommodated in the first integral cylindrical housing, the motor including
a rotor shaft,
a stator having an outer circumference directly held by the first integral cylindrical housing, and
a rotor located circumferentially inward from the stator with a rear portion of the rotor shaft directly held by the first integral cylindrical housing with a bearing;
a switch and a controller accommodated in the right-left dividable housing;
a power transmitter accommodated in the second integral cylindrical housing, the power transmitter being drivable by the motor;
a tip tool holder in front of the second integral cylindrical housing, the tip tool holder being rotatable by the power transmitter; and
a plurality of screws extending in a front-rear direction, the plurality of screws fastening the first integral cylindrical housing, the right-left dividable housing, and the second integral cylindrical housing together.

18. The electric rotary tool according to claim 17, further comprising:
a fan fixed to the rotor,
wherein the first integral cylindrical housing includes, on right and left sides of the first integral cylindrical housing, an inlet to cause air from the fan to flow into the first integral cylindrical housing and an outlet to cause air from the fan to flow out of the first integral cylindrical housing.

19. The electric rotary tool according to claim 17, wherein the first integral cylindrical housing includes a front portion fitted in a rear portion of the right-left dividable housing.

* * * * *